United States Patent
Lu et al.

(10) Patent No.: US 11,453,760 B2
(45) Date of Patent: *Sep. 27, 2022

(54) FLUORESCENT ORANGE LATEX WITH ENHANCED BRIGHTNESS AND TONERS MADE THEREFROM

(71) Applicant: Xerox Corporation, Norwalk, CT (US)

(72) Inventors: Chunliang Lu, Webster, NY (US); Peter V. Nguyen, Webster, NY (US); Yu Qi, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 268 days.

This patent is subject to a terminal disclaimer.

(21) Appl. No.: 16/822,438

(22) Filed: Mar. 18, 2020

(65) Prior Publication Data

US 2021/0294234 A1    Sep. 23, 2021

(51) Int. Cl.
| | | |
|---|---|---|
| *C08K 5/00* | (2006.01) | |
| *C08K 5/1545* | (2006.01) | |
| *C08K 5/16* | (2006.01) | |
| *G03G 9/09* | (2006.01) | |
| *G03G 9/093* | (2006.01) | |

(52) U.S. Cl.
CPC .......... *C08K 5/0041* (2013.01); *C08K 5/1545* (2013.01); *C08K 5/16* (2013.01); *G03G 9/0914* (2013.01); *G03G 9/09335* (2013.01); *G03G 9/09371* (2013.01); *G03G 9/09392* (2013.01)

(58) Field of Classification Search
CPC ...... C08K 5/0041; C08K 5/1545; C08K 5/16; G03G 9/08755; C09K 11/06
USPC ......................................................... 524/82
See application file for complete search history.

(56) References Cited

U.S. PATENT DOCUMENTS

| | | | |
|---|---|---|---|
| 5,604,076 | A | 2/1997 | Patel et al. |
| 5,863,887 | A * | 1/1999 | Gillette ................ C11D 17/046 510/499 |
| 6,169,185 | B1 * | 1/2001 | Likavec ................ G03G 9/122 548/305.1 |
| 6,413,692 | B1 | 7/2002 | Cheng |
| 6,455,220 | B1 | 9/2002 | Cheng |
| 8,541,154 | B2 | 9/2013 | Iftime et al. |
| 8,810,630 | B2 | 8/2014 | Kim et al. |
| 8,916,317 | B2 | 12/2014 | Iftime et al. |
| 9,280,076 | B1 | 3/2016 | Li et al. |
| 9,557,670 | B2 | 1/2017 | Shiba et al. |
| 9,798,255 | B1 * | 10/2017 | Wang .................. G03G 9/0804 |
| 10,254,667 | B2 | 4/2019 | Tanaka et al. |
| 2008/0090726 | A1 | 4/2008 | Eskra et al. |
| 2009/0047593 | A1 | 2/2009 | Vanbesien et al. |
| 2010/0135700 | A1 | 6/2010 | Mutoh et al. |
| 2010/0173239 | A1 | 7/2010 | Iftime et al. |
| 2010/0248118 | A1 | 9/2010 | Gong et al. |
| 2011/0086301 | A1 | 4/2011 | Cheng et al. |
| 2011/0223528 | A1 | 9/2011 | Ohno et al. |
| 2012/0021353 | A1 | 1/2012 | Nagasawa et al. |
| 2012/0043504 | A1 | 2/2012 | Yang et al. |
| 2012/0237868 | A1 | 9/2012 | Yamada et al. |
| 2014/0197364 | A1 | 7/2014 | Richards-Johnson et al. |
| 2014/0370438 | A1 | 12/2014 | Qui et al. |
| 2017/0145236 | A1 | 5/2017 | Harada |
| 2018/0157184 | A1 | 6/2018 | Jan |
| 2018/0258237 | A1 | 9/2018 | Smink et al. |
| 2019/0062527 | A1 * | 2/2019 | Mizushima ............ C08K 5/098 |
| 2020/0002555 | A1 | 1/2020 | Marti Abril |
| 2020/0073271 | A1 | 3/2020 | Murai |
| 2021/0141318 | A1 | 5/2021 | Flores et al. |
| 2021/0255559 | A1 * | 8/2021 | Tanaka ............... G03G 9/08755 |
| 2021/0294230 | A1 | 9/2021 | Qi et al. |
| 2021/0294231 | A1 | 9/2021 | Qi et al. |
| 2021/0294232 | A1 | 9/2021 | Lu et al. |
| 2021/0294233 | A1 | 9/2021 | Lu et al. |
| 2021/0294235 | A1 | 9/2021 | Qi et al. |
| 2021/0294236 | A1 | 9/2021 | Lu |

FOREIGN PATENT DOCUMENTS

| | | |
|---|---|---|
| EP | 1521128 A2 | 4/2005 |
| EP | 2290454 A1 | 3/2011 |
| EP | 3457214 A1 | 8/2018 |
| JP | 1-101558 | 10/1987 |
| JP | H01 201677 | 8/1989 |
| JP | 200244336 | 8/2002 |
| JP | 2005-208362 | 8/2005 |
| JP | 2009-086331 A | 4/2009 |
| WO | WO2011/0136974 A1 | 2/2011 |
| WO | WO 2018/190247 A1 | 10/2018 |

OTHER PUBLICATIONS

Extended Search Report for European Application No. 21160841.9, dated Aug. 12, 2021.

* cited by examiner

*Primary Examiner* — Doris L Lee
(74) *Attorney, Agent, or Firm* — Bell & Manning, LLC

(57) ABSTRACT

Fluorescent orange latexes are provided which comprise water and fluorescent agent-incorporated resin particles, the particles comprising a resin, Solvent Red 49 as a red fluorescent agent, and Solvent Yellow 98 as a yellow fluorescent agent, wherein the fluorescent orange latex has a weight ratio of the Solvent Yellow 98 to the Solvent Red 49 in a range of from 20:1 to 0.5:1. Fluorescent orange toners and methods of making and using the fluorescent orange toners are also provided.

14 Claims, 2 Drawing Sheets

FLUORESCENT ORANGE LATEX WITH ENHANCED BRIGHTNESS AND TONERS MADE THEREFROM

BACKGROUND

Conventional xerographic printing systems for toner applications consist of four stations comprising cyan, magenta, yellow, and black (CMYK) toner stations. These and other xerographic printing systems can be made to print specialty colors, including fluorescent toners. A variety of fluorescent toners have been developed, but improved fluorescent toners are desirable.

SUMMARY

The present disclosure provides fluorescent orange latexes and compositions formed from the fluorescent orange latexes, such as toners and inkjet printing compositions. Related methods are also provided.

In one aspect, fluorescent orange latexes are provided. In embodiments, a fluorescent orange latex comprises water and fluorescent agent-incorporated resin particles, the particles comprising a resin, Solvent Red 49 as a red fluorescent agent, and Solvent Yellow 98 as a yellow fluorescent agent, wherein the fluorescent orange latex has a weight ratio of the Solvent Yellow 98 to the Solvent Red 49 in a range of from 20:1 to 0.5:1.

In another aspect, fluorescent orange toners are provided. In embodiments, a fluorescent orange toner comprises fluorescent agent-incorporated resin particles, the particles comprising a resin, Solvent Red 49 as a red fluorescent agent, and Solvent Yellow 98 as a yellow fluorescent agent, wherein the fluorescent orange latex has a weight ratio of the Solvent Yellow 98 to the Solvent Red 49 in a range of from 20:1 to 0.5:1.

In another aspect, methods of making fluorescent orange toners are provided. In embodiments, such a method comprises forming one or more fluorescent latexes which comprise Solvent Red 49 as a red fluorescent agent, Solvent Yellow 98 as a yellow fluorescent agent, a first type of amorphous resin, and a second type of amorphous resin, wherein the Solvent Yellow 98 and the Solvent Red 49 and are present in a weight ratio in a range of from 20:1 to 0.5:1; forming a mixture comprising the one or more fluorescent latexes; one or more emulsions which comprise a crystalline resin, the first type of amorphous resin, the second type of amorphous resin; and optionally, a wax dispersion; aggregating the mixture to form particles of a predetermined size; forming a shell over the particles of the predetermined size to form core-shell particles; and coalescing the core-shell particles to form a fluorescent orange toner.

BRIEF DESCRIPTION OF THE DRAWINGS

Illustrative embodiments of the disclosure will hereafter be described with reference to the accompanying drawings.

DETAILED DESCRIPTION

Figure 1:
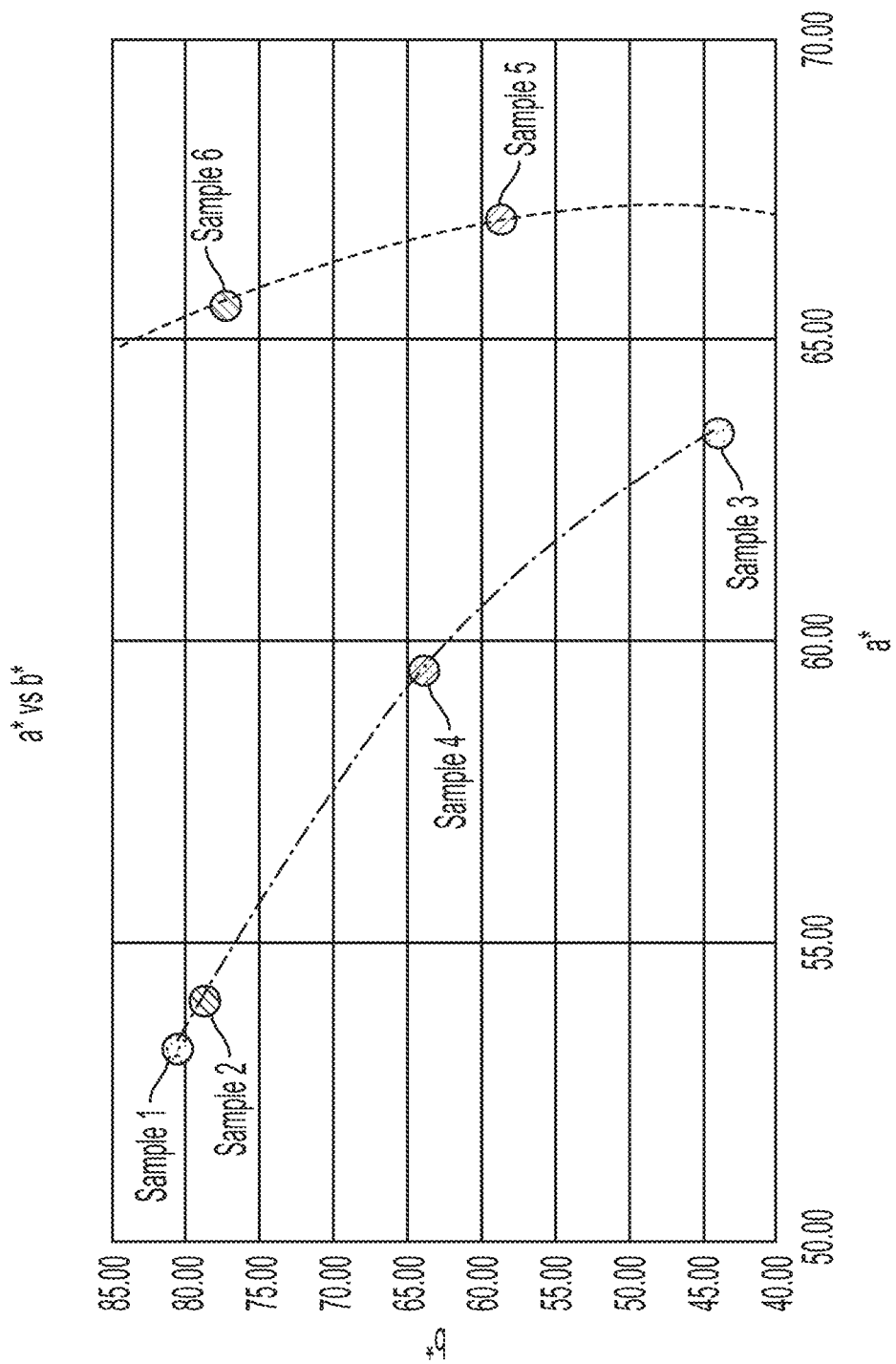
FIG. 1 shows color channel data for fluorescent orange latexes according to an illustrative embodiment. The toner mass area (TMA) was 0.5 mg/cm$^2$.

The present disclosure provides fluorescent orange latexes and compositions formed from the fluorescent orange latexes, such as toners and inkjet printing compositions. Related methods are also provided.

The present fluorescent orange latexes comprise fluorescent agent-incorporated resin particles which are resin particles having incorporated therein a red fluorescent agent and a yellow fluorescent agent. Although some fluorescent latexes for toners have been developed, the brightness of such latexes and toners has been limited. The present disclosure is based, at least in part, on the use of a specific pair of fluorescent agents, Solvent Red 49 as the red fluorescent agent and Solvent Yellow 98 as the yellow fluorescent agent. It has been found that this pair is particularly advantageous as the pair is capable of undergoing Förster resonance energy transfer (FRET). As such, the pair may be referred to as a FRET pair. In order to form a FRET pair, the emission spectrum of the yellow fluorescent agent must adequately overlap with the absorption spectrum of the red fluorescent agent. Upon illumination with light to excite the yellow fluorescent agent, the excited yellow fluorescent agent transfers energy to the red fluorescent agent via nonradiative energy transfer to induce fluorescence emission from the red fluorescent agent. The greater the degree of overlap between the normalized emission spectrum of the yellow fluorescent agent and the normalized absorption spectrum of the red fluorescent agent, the greater the FRET efficiency and the greater the overall fluorescence emission from the fluorescent latex and compositions formed from the fluorescent latex. In the case of Solvent Yellow 98 and Solvent Red 49, the degree of overlap is very large, about >90%.

As demonstrated in the Example, below, an additional advantage of the Solvent Yellow 98 and Solvent Red 49 pair relates to the orange color space defined by a color channel a* range of from 40 to 85 and a color channel b* range of from 40 to 85. (Color channels a*, b* are described further below). This FRET pair covers a very large area in this orange color space, thereby providing a much greater gamut of orange color as compared to Solvent Red 49 combined with other yellow fluorescent agents such as Solvent Yellow 160:1. In addition, a much greater amount of Solvent Yellow 98 may be added (as compared to Solvent Yellow 160:1) while still providing an orange color. This further enhances the reflectance (brightness) of the fluorescent orange latex and compositions thereof. This is also demonstrated in the Example, below.

In embodiments, the present fluorescent orange latexes further comprise a fluorescent brightener. The fluorescent brightener may also be selected such that it forms another FRET pair with the yellow fluorescent agent, the red fluorescent agent, or both. Moreover, the fluorescent brightener may be selected to provide a desired degree of overlap with the absorption spectrum of its partner, e.g., greater than 5%, greater than 15%, greater than 20%, greater than 30%, or in a range of from 30% to 100%.

In embodiments, the fluorescent brightener has an absorption spectrum spanning a range of from 300 nm to 400 nm and an emission spectrum spanning a range of from 380 nm to 650 nm. This includes the fluorescent brightener having an absorption spectrum spanning a range of from 300 nm to 380 nm. This includes the fluorescent brightener having an emission spectrum spanning a range of from 400 nm to 550 nm. It is also desirable that the fluorescent brightener absorb no light in a range of from 380 nm to 700 nm. The phrase "no light" encompasses zero but also a small amount of absorption, provided the fluorescent brightener appears colorless to the human eye.

FRET efficiency is also related to the separation distance (d) between donor fluorescent agent and acceptor fluorescent agent molecules (efficiency $\propto d^{-6}$). Thus, to actually achieve FRET in the present fluorescent orange latexes, the red and yellow fluorescent agents and if present, the fluorescent brightener, are sufficiently close together (i.e., present at sufficiently high concentration, although not so high as to result in fluorescence quenching) and homogeneously distributed in the resin particles. The method of forming the fluorescent orange latexes as further described below achieves such an appropriate concentration and homogeneous distribution. Confirmation of FRET may be carried out as further described below.

Illustrative fluorescent brighteners include the following: Fluorescent Brightener 184, Optical Brightener 1 (Fluorescent Brightening Agent 393), Optical Brightener 2, Optical Brightener 3, Optical Brightener C, Optical Brightener OB, Optical Brightener R, Optical Brightener Hostalux KSN, Optical Brightener Hostalux KCB, Optical Brightener Telalux KSB, Fluorescent Brightener 127, CBS-127, Optical Brightener PF, Optical Brightener UVT1, Optical Brightener ST, Optical Brightener OEF, Optical Brightener RT, Tinopal CBS-X, DMS/AMS, CBS-155, 378, 367, 368, 185, 199, 199:1, 199:2, Optical Brightener ER-IV, Optical Brightener ER-V, Optical Brightener 4BK, Optical Brightener ER-I/ER-I L, Optical Brightener ER-II/ER-II L, Optical Brightener EBF/EBF-L, PF/DT, BA, CXT, R4, MST-L, BAC, SWN/AW-L, WGS, NFW, PC, BBU/BBU-L, VBL/VBL-L. In embodiments, the fluorescent brightener is Fluorescent Brightener 184. Combinations of different types of fluorescent brighteners may be used.

The relative amount of the yellow and red fluorescent agents is selected to achieve a color channel a* of from 40 to 85 and a color channel b* of from 40 to 85. This relative amount corresponds to a weight ratio of yellow:red in a range of from 20:1 to 0.3:1. This includes a weight ratio in a range of from 15:1 to 0.5:1, from 10:1 to 1:1, from 12:1 to 1:1, from 11:1 to 2:1, and from 10:1 to 3:1. The relative amount of the fluorescent brightener, if present, as compared to the total amount of the red and yellow fluorescent agents may vary. In embodiments, the weight ratio of (fluorescent brightener):(red and yellow fluorescent agents) is in a range of from 1:200 to 1:0.01, from 1:50 to 1:0.05, or from 1:10 to 1:0.5. The total amount of the fluorescent agents (red, yellow, and brightener, if present) in the fluorescent orange latex may be from 0.1 weight % to 10 weight % by weight of the fluorescent orange latex. This includes a total amount of from 0.1 weight % to 8 weight %, from 0.2 weight % to 6 weight %, from 0.5 weight % to 5 weight %, and from 1 weight % to 2 weight %. These ranges are useful to achieve an appropriate concentration to ensure FRET while also preventing fluorescence quenching.

Resins

The resin particles of the present fluorescent orange latexes provide a polymeric matrix to contain the red and yellow fluorescent agents and the fluorescent brightener, if present. The resin particles may comprise more than one different type of resin. The resin may be an amorphous resin, a crystalline resin, a mixture of amorphous resins, or a mixture of crystalline and amorphous resins. The resin may be a polyester resin, including an amorphous polyester resin, a crystalline polyester resin, a mixture of amorphous polyester resins, or a mixture of crystalline and amorphous polyester resins. It is noted that this section also describes resins which may be included in compositions formed from the present fluorescent orange latexes, e.g., toners.

Crystalline Resin

The resin may be a crystalline polyester resin formed by reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol, combinations thereof, and the like including their structural isomers. The aliphatic diol may be, for example, selected in an amount of from about 40 to about 60 mole percent of the resin, from about 42 to about 55 mole percent of the resin, or from about 45 to about 53 mole percent of the resin, and a second diol may be selected in an amount of from about 0 to about 10 mole percent of the resin or from about 1 to about 4 mole percent of the resin.

Examples of organic diacids or diesters including vinyl diacids or vinyl diesters selected for the preparation of crystalline resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof. The organic diacid may be selected in an amount of, for example, from about 40 to about 60 mole percent of the resin, from about 42 to about 52 mole percent of the resin, or from about 45 to about 50 mole percent of the resin, and a second diacid can be selected in an amount of from about 0 to about 10 mole percent of the resin.

Polycondensation catalysts which may be utilized in forming crystalline (as well as amorphous) polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate), and mixtures thereof. Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), poly (propylene-sebecamide), and mixtures thereof. Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), poly(butylene-succinimide), and mixtures thereof.

In embodiments, the crystalline polyester resin has the following formula (I)

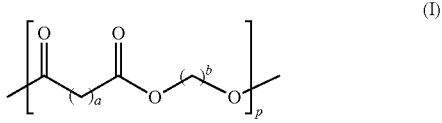

wherein each of a and b may range from 1 to 12, from 2 to 12, or from 4 to 12 and further wherein p may range from 10 to 100, from 20 to 80, or from 30 to 60. In embodiments, the crystalline polyester resin is poly(1,6-hexylene-1,12-dodecanoate), which may be generated by the reaction of dodecanedioc acid and 1,6-hexanediol.

As noted above, the disclosed crystalline polyester resins may be prepared by a polycondensation process by reacting suitable organic diols and suitable organic diacids in the presence of polycondensation catalysts. A stoichiometric equimolar ratio of organic diol and organic diacid may be utilized, however, in some instances where the boiling point of the organic diol is from about 180° C. to about 230° C., an excess amount of diol, such as ethylene glycol or propylene glycol, of from about 0.2 to 1 mole equivalent, can be utilized and removed during the polycondensation process by distillation. The amount of catalyst utilized may vary, and can be selected in amounts, such as for example, from about 0.01 to about 1 or from about 0.1 to about 0.75 mole percent of the crystalline polyester resin.

The crystalline resin can possess various melting points of, for example, from about 30° C. to about 120° C., from about 50° C. to about 90° C., or from about 60° C. to about 80° C. The crystalline resin may have a number average molecular weight ($M_n$), as measured by gel permeation chromatography (GPC) of, for example, from about 1,000 to about 50,000, from about 2,000 to about 25,000, or from about 5,000 to about 20,000, and a weight average molecular weight ($M_w$) of, for example, from about 2,000 to about 100,000, from about 3,000 to about 80,000, or from about 10,000 to about 30,000, as determined by GPC. The molecular weight distribution ($M_w/M_n$) of the crystalline resin may be, for example, from about 2 to about 6, from about 3 to about 5, or from about 2 to about 4.

Amorphous Resin

The resin may be an amorphous polyester resin formed by reacting a diol with a diacid in the presence of an optional catalyst. Examples of diacids or diesters including vinyl diacids or vinyl diesters utilized for the preparation of amorphous polyesters include dicarboxylic acids or diesters such as terephthalic acid, phthalic acid, isophthalic acid, fumaric acid, trimellitic acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacids or diesters may be present, for example, in an amount from about 40 to about 60 mole percent of the resin, from about 42 to about 52 mole percent of the resin, or from about 45 to about 50 mole percent of the resin.

Examples of diols which may be utilized in generating an amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and combinations thereof. The amount of organic diols selected may vary, for example, the organic diols may be present in an amount from about 40 to about 60 mole percent of the resin, from about 42 to about 55 mole percent of the resin, or from about 45 to about 53 mole percent of the resin.

Examples of suitable amorphous resins include polyesters, polyamides, polyimides, polyolefins, polyethylene, polybutylene, polyisobutyrate, ethylene-propylene copolymers, ethylene-vinyl acetate copolymers, polypropylene, and the like, and mixtures thereof.

An unsaturated amorphous polyester resin may be utilized as a resin. Examples of such resins include those disclosed in U.S. Pat. No. 6,063,827, the disclosure of which is hereby incorporated by reference in its entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

A suitable polyester resin may be an amorphous polyester such as a poly(propoxylated bisphenol A co-fumarate) resin. Examples of such resins and processes for their production include those disclosed in U.S. Pat. No. 6,063,827, the disclosure of which is hereby incorporated by reference in its entirety.

Suitable polyester resins include amorphous acidic polyester resins. An amorphous acid polyester resin may be based on any combination of propoxylated bisphenol A, ethoxylated bisphenol A, terephthalic acid, fumaric acid, and dodecenyl succinic anhydride, such as poly(propoxylated bisphenol-co-terephthlate-fumarate-dodecenylsuccinate). Another amorphous acid polyester resin which may be used is poly(propoxylated-ethoxylated bisphenol-co-terephthalate-dodecenylsuccinate-trimellitic anhydride).

An example of a linear propoxylated bisphenol A fumarate resin which may be utilized as a resin is available under the trade name SPAMII from Resana S/A Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, N.C., and the like.

The amorphous resin or combination of amorphous resins may have a glass transition temperature of from about 30° C. to about 80° C., from about 35° C. to about 70° C., or from about 40° C. to about 65° C. The glass transition temperature may be measured using differential scanning calorimetry (DSC). The amorphous resin may have a $M_n$, as measured by GPC of, for example, from about 1,000 to about 50,000, from about 2,000 to about 25,000, or from about 1,000 to about 10,000, and a $M_w$ of, for example, from about 2,000 to about 100,000, from about 5,000 to about 90,000, from about 10,000 to about 90,000, from about 10,000 to about 30,000, or from about 70,000 to about 100,000, as determined by GPC.

The resin(s) in the present toners may possess acid groups which may be present at the terminal of the resin. Acid groups which may be present include carboxylic acid groups, and the like. The number of carboxylic acid groups may be controlled by adjusting the materials utilized to form the resin and reaction conditions. In embodiments, the resin is a polyester resin having an acid number from about 2 mg KOH/g of resin to about 200 mg KOH/g of resin, from about 5 mg KOH/g of resin to about 50 mg KOH/g of resin, or from about 5 mg KOH/g of resin to about 15 mg KOH/g of resin. The acid containing resin may be dissolved in tetrahydrofuran solution. The acid number may be detected by titration with KOH/methanol solution containing phenolphthalein as the indicator. The acid number may then be calculated based on the equivalent amount of KOH/methanol required to neutralize all the acid groups on the resin identified as the end point of the titration.

The present fluorescent orange latex may comprise a single type of resin, e.g., a single type of amorphous polyester resin, or multiple types of resins, e.g., two different types of amorphous polyester resins. In such embodiments, one of the amorphous polyester resins has an $M_n$ or $M_w$ that is greater than the other. In embodiments in which two different types of amorphous polyester resins are used, the weight ratio of the two types may be from 2:3 to 3:2. This includes a weight ratio of 1:1. Alternatively, two separate fluorescent orange latexes may be used, each comprising a different type of amorphous polyester resin. However, together, the fluorescent orange latex(es) provide the two different types of amorphous polyester resins within this range of weight ratios. These weight ratios are useful for ensuring a homogeneous distribution of the fluorescent agents once incorporated into the resin particles. This also prevents fluorescence quenching while facilitating FRET.

The total amount of the resins may be present in the fluorescent orange latex in an amount of, for example, from 1 weight % to 60 weight % by weight of the fluorescent latex. This includes total amounts of resin in a range of from 5 weight % to 50 weight % and from 10 weight % to 40 weight %.

As noted above, the form of the fluorescent agent-incorporated resins is that of particles. The particles may have an average size in a range of from 20 nm to 1000 nm, as measured by dynamic light scattering.

Other Components

The present fluorescent orange latexes generally further comprise one or more solvents, although they may also be utilized in a dried form. Water is typically used as a solvent, but organic solvent(s) may be included. Other components may be included, e.g., one or more types of defoamers, one or more types of surfactants, one or more types of biocides. Surfactants include sodium dodecyl sulfate, Calfax/Dowfax, sodium dioctyl sulfosuccinate, sodium dodecylbenzene sulfonate, etc. Biocides include Proxel GXL, Kathon biocides, Bioban preservatives, Rocima 586 Microblade, Ucarcide Antimicrobials, Dowicide Antimicrobials, etc.

Fluorescent Orange Latex Preparation

The fluorescent agent-incorporated resin particles and the fluorescent orange latexes comprising the particles may be prepared as follows. A mixture may be formed by combining the desired fluorescent agent, the desired resin, and a solvent. The solvent may be a solvent system comprising one or more organic solvents (acetone, tetrahydrofuran, ethyl acetate, methyl ethyl ketone, methylene chloride, methanol, ethanol, n-propyl alcohol, isopropyl alcohol, butanol, etc.) as well as water. Other additives may be included in the mixture, e.g., one or more types of surfactants (see "Other Components," above) and one or more types of base (sodium hydroxide, potassium hydroxide, ammonia, triethyl amine, sodium bicarbonate, etc.)

As noted above, the desired fluorescent agent may include both the red fluorescent agent, the yellow fluorescent agent as well as one or more types of the fluorescent brighteners. The desired resin may include more than one type of resin. It is desirable for FRET pairs to be formed in the same fluorescent latex in order to facilitate FRET. However, as also noted above, separate fluorescent latexes may be prepared and used, e.g., one fluorescent latex comprising the yellow fluorescent agent and another fluorescent latex comprising the red fluorescent agent.

The resulting fluorescent agent/resin/solvent mixture is heated to a temperature (e.g., from 30° C. to 80° C., 40° C. to 75° C., 45° C. to 70° C.) and for a time (e.g., 20 minutes to 5 hours, 30 minutes to 2 hours, 1 hour) while mixing to homogenize the mixture. Additional base may be added to neutralize the resin while mixing. Mixing is carried out to ensure homogenization and to provide fluorescent agent-incorporated resin particles having a desired size. (Mixing and homogenization is further described below with respect to toners.) An amount of surfactant, and/or a biocide may be added. Finally, organic solvents may be removed by distillation. Water may be added during this process to keep the desired solid content. The resulting fluorescent orange latex may be used to form any kind of composition in which fluorescence is desired. Illustrative compositions include toners and inkjet printing compositions, thereby rendering such compositions fluorescent. These illustrative compositions are further described below.

The fluorescence of the fluorescent orange latexes as well as the existence of FRET occurring in the fluorescent orange latexes may be confirmed and quantified using a spectrodensitometer (such as Hunter, X-Rite, etc.) or a fluorescence spectrometer, operated in accordance with the manufacturer's instructions. These systems may be used to determine lightness L*, color channels, a* and b*, and reflectance for the fluorescent orange latexes. Regarding lightness L*, the CIELAB color space (also known as CIE L*a*b* or sometimes abbreviated as simply "Lab" color space) is a color space defined by the International Commission on Illumination (CIE). It expresses color as three values: L* for the lightness from black (0) to white (100), a* from green (−) to red (+), and b* from blue (−) to yellow (+).

Because three parameters are measured, the space itself is a three-dimensional real number space, which allows for infinitely many possible colors. In practice, the space is usually mapped onto a three-dimensional integer space for digital representation, and thus the L*, a*, and b* values are usually absolute, with a pre-defined range. The lightness value, L*, represents the darkest black at L*=0, and the brightest white at L*=100. The color channels, a* and b*, represent true neutral gray values at a*=0 and b*=0. The a* axis represents the green-red component, with green in the negative direction and red in the positive direction. The b* axis represents the blue-yellow component, with blue in the negative direction and yellow in the positive direction. The scaling and limits of the a* and b* axes will depend on the specific implementation, but they often run in the range of ±100 or −128 to +127 (signed 8-bit integer).

As noted above, the present fluorescent orange latexes are characterized by a color channel a* of from 40 to 85 and a color channel b* of from 40 to 85. The fluorescent orange latexes having at least one FRET pair of Solvent Red 49 and Solvent Yellow 98 and exhibiting FRET (due to appropriate concentration and homogeneous distribution) are characterized as having significantly higher lightness L* and reflectance values as compared to a comparative fluorescent latex having a different combination of red and yellow fluorescent agents (e.g., Solvent Red 49 and Solvent Yellow 160:1). Lightness L* and reflectance is even greater by incorporating a fluorescent brightener.

Toners

In order to form the present toners, any of the resins described above may be provided as an emulsion(s), e.g., by using a solvent-based phase inversion emulsification process. The emulsions may then be utilized as the raw materials to form the toners, e.g., by using an emulsion aggregation and coalescence (EA) process. However, the toners may be prepared using other processes. As noted above, any of the fluorescent orange latexes described above may be used in the toner preparation process to form fluorescent orange toners.

The toner may also include a wax, which may be incorporated into the toner as a separate dispersion of the wax in water. However, the toner generally does not include any pigments or any other colorants besides the fluorescent agents described above.

Wax

Optionally, a wax may be included in the present toners. A single type of wax or a mixture of two or more different waxes may be used. A single wax may be added, for example, to improve particular toner properties, such as toner particle shape, presence and amount of wax on the toner particle surface, charging and/or fusing characteristics, gloss, stripping, offset properties, and the like. Alternatively, a combination of waxes can be added to provide multiple properties to the toner composition.

When included, the wax may be present in an amount of, for example, from about 1 weight % to about 25 weight % by weight of the toner or from about 5 weight % to about 20 weight % by weight of the toner particles.

When a wax is used, the wax may include any of the various waxes conventionally used in emulsion aggregation toners. Waxes that may be selected include waxes having, for example, an average molecular weight of from about 500 to about 20,000 or from about 1,000 to about 10,000. Waxes that may be used include, for example, polyolefins such as polyethylene including linear polyethylene waxes and branched polyethylene waxes, polypropylene including linear polypropylene waxes and branched polypropylene waxes, polymethylene waxes, polyethylene/amide, polyethylenetetrafluoroethylene, polyethylenetetrafluoroethylene/amide, and polybutene waxes such as commercially available from Allied Chemical and Petrolite Corporation, for example POLYWAX™ polyethylene waxes such as commercially available from Baker Petrolite, wax emulsions available from Michaelman, Inc. and the Daniels Products Company, EPOLENE N15™ commercially available from Eastman Chemical Products, Inc., and VISCOL 550P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax such as waxes derived from distillation of crude oil, silicone waxes, mercapto waxes, polyester waxes, urethane waxes; modified polyolefin waxes (such as a carboxylic acid-terminated polyethylene wax or a carboxylic acid-terminated polypropylene wax); Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethylene glycol monostearate, dipropylene glycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, such as aliphatic polar amide functionalized waxes; aliphatic waxes consisting of esters of hydroxylated unsaturated fatty acids, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes may also be used in embodiments. Waxes may be included as, for example, fuser roll release agents. In embodiments, the waxes may be crystalline or non-crystalline.

In embodiments, the toner is prepared by an EA process, such as by aggregating a mixture of an emulsion comprising a resin; the red fluorescent agent, the yellow fluorescent agent, and if present, the fluorescent brightener (provided as one or more fluorescent latexes, but preferably one to ensure FRET); and optionally, a wax (provided as a separate dispersion); and then coalescing the mixture. The emulsion comprising the resin may comprise one or more resins or different resins may be provided as different emulsions. The emulsion(s) comprising the resin generally do not comprise and thus, are free of the fluorescent agents. In order to ensure a homogeneous distribution of the FRET pair as well as to achieve FRET without fluorescence quenching in the final toner, in the EA process, the red-yellow FRET pair is provided as the one or more fluorescent latexes (and preferably, one) separate from the other components of the mixture and as opposed to simply adding the fluorescent agents themselves to the mixture.

Next, the mixture may be homogenized which may be accomplished by mixing at about 600 to about 6,000 revolutions per minute. Homogenization may be accomplished by any suitable means, including, for example, an IKA ULTRA TURRAX T50 probe homogenizer. An aggregating agent may be added to the mixture. Any suitable aggregating agent may be utilized. Suitable aggregating agents include, for example, aqueous solutions of a divalent cation or a multivalent cation material. The aggregating agent may be, for example, an inorganic cationic aggregating agent such as a polyaluminum halide such as polyaluminum chloride (PAC), or the corresponding bromide, fluoride, or iodide; a polyaluminum silicate such as polyaluminum sulfosilicate (PASS); or a water soluble metal salt including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, and copper sulfate; or combinations thereof. The aggregating agent may be added to the mixture at a temperature that is below the glass transition temperature ($T_g$) of the resin (s). The aggregating agent may be added to the mixture under homogenization.

The aggregating agent may be added to the mixture in an amount of, for example, from about 0 weight % to about 10 weight % by weight of the total amount of resin, from about 0.2 weight % to about 8 weight % by weight of the total amount of resin, or from about 0.5 weight % to about 5 weight % by weight of the total amount of resin.

The particles of the mixture may be permitted to aggregate until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for volume average particle size. The aggregation thus may proceed by maintaining an elevated temperature, or slowly raising the temperature to, for example, in embodiments, from about 30° C. to about 100° C., in embodiments from about 30° C. to about 80° C., or in embodiments from about 30° C. to about 50° C. The temperature may be held for a period time of from about 0.5 hours to about 6 hours, or in embodiments from about hour 1 to about 5 hours, while stirring, to provide the aggregated particles. Once the predetermined desired particle size is reached, a shell may be added (although a shell is not required). The volume average particle size of the particles prior to application of a shell may be, for example, from about 3 μm to about 10 μm, in embodiments, from about 4 μm to about 9 μm, or from about 6 μm to about 8 μm.

Shell Resin

After aggregation, but prior to coalescence, a resin coating may be applied to the aggregated particles to form a shell thereover. Any of the resins described above may be utilized in the shell. In embodiments, an amorphous polyester resin is utilized in the shell. In embodiments, two amorphous polyester resins (of different types) are utilized in the shell. In embodiments, a crystalline polyester resin and two different types of amorphous polyester resins are utilized in the core and the two different types of amorphous polyester resins are utilized in the shell. The shell resins generally do not comprise, and thus, are free of, the fluorescent agents.

The shell may be applied to the aggregated particles by using the shell resins in the form of emulsion(s) as described above. Such emulsions may be combined with the aggregated particles under conditions sufficient to form a coating over the aggregated particles. For example, the formation of the shell over the aggregated particles may occur while heating to a temperature of from about 30° C. to about 80° C. or from about 35° C. to about 70° C. The formation of the shell may take place for a period of time from about 5 minutes to about 10 hours or from about 10 minutes to about 5 hours.

Once the desired size of the toner particles is achieved, the pH of the mixture may be adjusted with a pH control agent, e.g., a base, to a value of from about 3 to about 10, or in embodiments from about 5 to about 9. The adjustment of the pH may be utilized to freeze, that is to stop, toner growth. The base utilized to stop toner growth may include any suitable base such as, for example, alkali metal hydroxides such as, for example, sodium hydroxide, potassium hydroxide, ammonium hydroxide, combinations thereof, and the like. In embodiments, a chelating agent such as ethylene diamine tetraacetic acid (EDTA) may be added to help adjust the pH to the desired values noted above. Other chelating agents may be used.

In embodiments, the size of the core-shell toner particles (prior to coalescence) may be from about 3 μm to about 10 μm, from about 4 μm to about 10 μm, or from about 6 μm to about 9 μm.

Coalescence

Following aggregation to the desired particle size and application of the shell (if any), the particles may then be coalesced to the desired final shape, the coalescence being achieved by, for example, heating the mixture to a temperature of from about 45° C. to about 150° C., from about 55° C. to about 99° C., or about 60° C. to about 90° C., which may be at or above the glass transition temperature of the resins utilized to form the toner particles. Heating may continue or the pH of the mixture may be adjusted (e.g., reduced) over a period of time to reach the desired circularity. The period of time may be from about 1 hours to about 5 hours or from about 2 hours to about 4 hours. Various buffers may be used during coalescence. The total time period for coalescence may be from about 1 to about 9 hours, from about 1 to about 8 hours, or from about 1 to about 5 hours. Stirring may be utilized during coalescence, for example, from about 20 rpm to about 1000 rpm or from about 30 rpm to about 800 rpm.

After aggregation and/or coalescence, the mixture may be cooled to room temperature. The cooling may be rapid or slow, as desired. A suitable cooling process may include introducing cold water to a jacket around the reactor. After cooling, the toner particles may be screened with a sieve of a desired size, filtered, washed with water, and then dried. Drying may be accomplished by any suitable process for drying including, for example, freeze-drying.

In the toner, the total amount of the fluorescent agents (red, yellow, and fluorescent brightener, if present) may be present in an amount of, for example, from 0.1 weight % to 10 weight % by weight of the toner. This includes a total amount of from 0.1 weight % to 8 weight % by weight of the toner, from 0.2 weight % to 6 weight % by weight of the toner, from 0.5 weight % to 5 weight % by weight of the toner, and from 1 weight % to 2 weight % by weight of the toner. These ranges are useful to ensure an appropriate concentration so as to achieve FRET while also preventing fluorescence quenching. The relative amounts of the red and yellow fluorescent agents and of the fluorescent brightener to the total amount of red and yellow fluorescent agents may be those as described above with respect to the fluorescent orange latex.

In the toner, a crystalline resin may be present, for example, in an amount of from about 1 weight % to about 85 weight % by weight of the toner, from about 5 weight % to about 50 weight % by weight of the toner, or from about 10 weight % to about 35 weight % by weight of the toner. An amorphous resin or combination of amorphous resins may be present, for example, in an amount of from about 5 weight % to about 95 weight % by weight of the toner, from about 30 weight % to about 90 weight % by weight of the toner, or from about 35 weight % to about 85 weight % by weight of the toner. In embodiments, crystalline and amorphous resins are used and the weight ratio of the resins is from about 80 weight % to about 60 weight % of the amorphous resin and from about 20 weight % to about 40 weight % of the crystalline resin. In such embodiments, the amorphous resin may be a combination of different types of amorphous resins, e.g., a combination of two different types of amorphous resins. In embodiments, one of the amorphous resins has an $M_n$ or $M_w$ that is greater than the other.

Other Additives

In embodiments, the toners may also contain other optional additives. For example, the toners may include positive or negative charge control agents. Surface additives may also be used. Examples of surface additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids such as zinc stearate, calcium stearate, and magnesium stearate, mixtures thereof and the like; long chain alcohols such as UNILIN 700; and mixtures thereof. Each of these surface additives may be present in an amount of from about 0.1 weight % to about 5 weight % by weight of the toner or from about 0.25 weight % by weight to about 3 weight % by weight of the toner.

Developers and Carriers

The toners may be formulated into a developer composition. Developer compositions can be prepared by mixing the toners with known carrier particles, including coated carriers, such as steel, ferrites, and the like. Such carriers include those disclosed in U.S. Pat. Nos. 4,937,166 and 4,935,326, the entire disclosures of each of which are incorporated herein by reference. The toners may be present in the carrier in amounts of from about 1 weight % to about 15 weight % by weight, from about 2 weight % to about 8 weight % by weight, or from about 4 weight % to about 6 weight % by weight. The carrier particles can also include a core with a polymer coating thereover, such as polymethylmethacrylate (PMMA), having dispersed therein a conductive component like conductive carbon black. Carrier coatings include silicone resins such as methyl silsesquioxanes, fluoropolymers such as polyvinylidiene fluoride, mixtures of resins not in close proximity in the triboelectric series such as polyvinylidiene fluoride and acrylics, thermosetting resins such as acrylics, mixtures thereof and other known components.

Applications

The toners may be used in a variety of xerographic processes and with a variety of xerographic printers. A xerographic imaging process includes, for example, preparing an image with a xerographic printer comprising a charging component, an imaging component, a photoconductive component, a developing component, a transfer component, and a fusing component. In embodiments, the development component may include a developer prepared by mixing a carrier with any of the toners described herein. The xerographic printer may be a high-speed printer, a black and white high-speed printer, a color printer, and the like. Once the image is formed with the toners/developers, the image may then be transferred to an image receiving medium such as paper and the like. Fuser roll members may be used to fuse the toner to the image-receiving medium by using heat and pressure.

Inkjet Printing Compositions

Another illustrative composition that may be formed from the present fluorescent orange latexes is an inkjet printing composition. Such compositions are configured to be jettable via an inkjet printing system. Such compositions may include any of the disclosed fluorescent orange latexes, a solvent (such as water), optionally, a co-solvent (such as a water soluble or water miscible organic solvent), and optionally, an additive such as a surfactant, a viscosity modifier to adjust the viscosity of the inkjet printing composition, or a surface leveling agent to adjust the surface tension of the inkjet printing composition. The desired components may be combined and mixed in the desired amounts. The inkjet printing compositions may be used with commercially available inkjet printing systems. Illustrative solvents, co-solvents, additives, illustrative amounts, and illustrative inkjet printing systems include those as described in U.S. Pat. Pub. No. 20190367753 which is hereby incorporated by reference in its entirety. In using such inkjet printing compositions to form an image, the inkjet printing composition may be deposited on a desired substrate via an inkjet printing system. The solvent(s) may then be evaporated from the as-deposited inkjet printing composition.

EXAMPLE

The following Example is being submitted to illustrate various embodiments of the present disclosure. The Example is intended to be illustrative only and is not intended to limit the scope of the present disclosure. Also, parts and percentages are by weight unless otherwise indicated. As used throughout this patent specification, "room temperature" refers to a temperature of from 20° C. to 25° C.

Fluorescent latexes were prepared as follows. A mixture of 120 g of a first type of an amorphous polyester resin, 80 g of a second type of an amorphous polyester resin, one or more fluorescent agents (see Table 1 below) were dissolved in a mixture of acetone, ethyl acetate and aqueous ammonia solution with a ratio of (145/48/40 g) in a 2L reactor at 40° C. Additional base solution was added to each mixture to completely neutralize the polyester resins. After about one hour and complete homogenization, deionized water was added to each mixture. The organic solvents were removed by applying a vacuum and water was added during this process to maintain the amount of desired water (to achieve a desired solids %). Finally, the resulting emulsion was filtered through a 25 μm sieve. Emulsions had an average particle size of about 250 nm, and a solids content of about 30%. The total fluorescent agent content in the emulsion was about 1%. A surfactant (Calfax) and a biocide (Proxel GXL) were added to stabilize the fluorescent latex and prevent biogrowth.

TABLE 1

Fluorescent Latexes.

| Sample | Solvent Red 49 (pph) | Solvent Yellow 160:1 (pph) | Solvent Yellow 98 (pph) | Fluorescent Brightener (pph) |
|---|---|---|---|---|
| 1 | 0.4 | — | 4.0 | 2.0 |
| 2 | 0.4 | — | 4.0 | — |
| 3 | 0.6 | — | 1.8 | 1.8 |

TABLE 1-continued

Fluorescent Latexes.

| Sample | Solvent Red 49 (pph) | Solvent Yellow 160:1 (pph) | Solvent Yellow 98 (pph) | Fluorescent Brightener (pph) |
|---|---|---|---|---|
| 4 | 0.4 | — | 2.5 | 1.0 |
| 5 | 0.4 | 1.8 | — | — |
| 6 | 0.6 | 1.8 | — | 1.8 |
| 7 | — | — | 2.0 | 2.0 |
| 8 | 2.0 | — | — | — |
| 9 | 1.8 | — | — | 1.8 |

Fluorescent toners were made using the fluorescent latexes of Table 1 as well as combinations of the fluorescent latexes of Table 1. An emulsion aggregation process was used as described herein.

Specifically, for each toner, a mixture was formed by combining the following: one or more of the fluorescent latexes of Table 1; a first emulsion comprising a crystalline polyester resin; a second emulsion comprising the first type of amorphous polyester resin; and the third emulsion comprising the second type of amorphous polyester resin. Next, the mixture was acidified. Next, aluminum sulfate (ALS) solution was added slowly while homogenizing the mixture after its pH was adjusted to below 5. The highly viscous mixture was transferred to a 2L reactor and aggregation initiated by increasing the temperature to about 45° C. When the particle size (D50v) reached about 7.0 µm, an emulsion containing the two amorphous polyester resins was added to the mixture to form a shell over the particles and the particles were allowed to continue grow. The particles were frozen by adding a chelating agent (EDTA) and a base (NaOH). The reactor temperature was increased to about 84° C. for coalescence. The heating was stopped when the particles reached the desired circularity. The particle slurry was quenched, the particles were then sieved, and filtered under vacuum. The filtered particles were washed with deionized water and freeze-dried.

Color analysis was conducted for the fluorescent orange toners printed on papers using Gretag X-rite type instrument. The results are shown in FIG. 1 for some of the toners. Specifically, the axes of FIG. 1 correspond to the color channel a* range and color channel b* range covering the orange color space and the a*, b* values obtained for several fluorescent orange toners are labeled. The results show that the fluorescent orange latexes comprising Solvent Yellow 98 and Solvent Red 49 (Samples 1-4) provide fluorescent orange toners that cover a much larger area in the orange color space, i.e., provide a much greater gamut of orange color as compared to fluorescent orange latexes comprising Solvent Yellow 160:1 and Solvent Red 49 (Samples 5-6).

Figure 2:
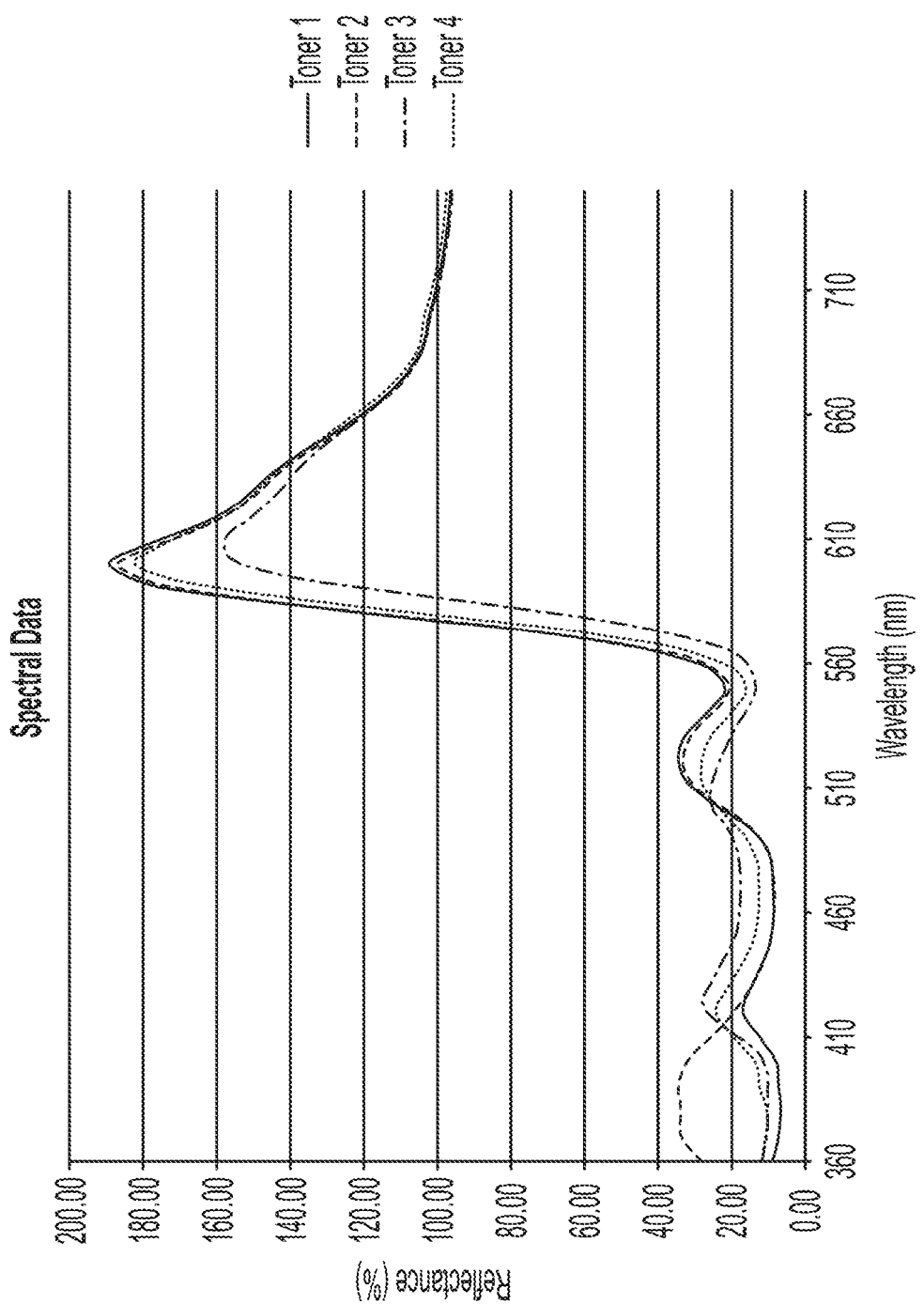
FIG. 2 shows reflectance spectra of fluorescent orange toners according to an illustrative embodiment. The TMA was 0.5 mg/cm$^2$.

Reflectance spectra were collected for the fluorescent toners printed on papers using Gretag X-rite type instrument. The results are shown in FIG. 2 for some of the toners. Toner 1 was formed from a mixture which included the fluorescent latex of sample 1. Toner 2 was formed from a mixture which included the fluorescent latex of sample 2. Toner 3 was formed from a mixture which included the fluorescent latex of sample 3. Toner 4 was formed from a mixture which included the fluorescent latex of sample 4. The results confirm the emission of orange fluorescence from the toners. These results also show that the fluorescent orange toners comprising Solvent Yellow 98 and Solvent Red 49 cover a large area in the orange color space (the peak reflectance shifts from about 600 nm to 610 nm). In addition, the results show that the peak reflectance (i.e., value of the reflectance at the peak) may be increased by using greater amounts of Solvent Yellow 98 as compared to Solvent Red 49 (compare Toner 1 having a SY98:SR49 ratio of 10, to Toner 4 having a SY98:SR49 ratio of 6.25 to Toner 3 having a SY98:SR49 ratio of 3). Finally, the results show the peak reflectance may be further increased by including a fluorescence brightener (compare Toner 1 and 2 having the same SY98:SR49 ratio of 10, but Toner 1 have a fluorescence brightener and Toner 2 without the fluorescence brightener). The increased peak reflectance is believed to be due to additional FRET occurring between the fluorescence brightener and Solvent Yellow 98.

It will be appreciated that variants of the above-disclosed and other features and functions or alternatives thereof, may be combined into many other different systems or applications. Various presently unforeseen or unanticipated alternatives, modifications, variations or improvements therein may be subsequently made by those skilled in the art, which are also intended to be encompassed by the following claims.

What is claimed is:

1. A fluorescent orange latex comprising water and fluorescent agent-incorporated resin particles, the particles comprising a resin, Solvent Red 49 as a red fluorescent agent, Solvent Yellow 98 as a yellow fluorescent agent, and a fluorescent brightener having a fluorescence emission spectrum that overlaps with an absorption spectrum of the yellow fluorescent agent, wherein the fluorescent orange latex has a weight ratio of the Solvent Yellow 98 to the Solvent Red 49 in a range of from 20:1 to 0.5:1, and wherein the fluorescent orange latex exhibits Förster Resonance Energy Transfer (FRET) under illumination with light having a wavelength to excite the yellow fluorescent agent and FRET under illumination with ultraviolet light.

2. The fluorescent orange latex of claim 1, wherein the fluorescence emission spectrum of the fluorescent brightener and the absorption spectrum of the yellow fluorescent agent have a degree of overlap of from 30% to 100%.

3. The fluorescent orange latex of claim 1, wherein the fluorescent brightener is Fluorescent Brightener 184.

4. The fluorescent orange latex of claim 1, having a total amount of the red fluorescent agent, the yellow fluorescent agent, and the fluorescent brightener in a range of from 0.5 weight % to 5 weight % by weight of the fluorescent orange latex and a weight ratio of the fluorescent brightener to the red and yellow fluorescent agents in a range of from 1:10 to 1:0.5.

5. The fluorescent orange latex of claim 1, wherein the particles have an average size in a range of from 20 nm to 1000 nm.

6. The fluorescent orange latex of claim 1, wherein the fluorescent orange latex exhibits a peak reflectance of at least 155% under illumination with ultraviolet light.

7. The fluorescent orange latex of claim 1, wherein the resin is a combination of two different types of resins.

8. The fluorescent orange latex of claim 7, wherein the two different types of resins are present in a weight ratio of from 2:3 to 3:2.

9. The fluorescent orange latex of claim 7, wherein the two different types of resins are two amorphous polyester resins.

10. The fluorescent orange latex of claim 9, wherein the two amorphous polyester resins are a poly(propoxylated bisphenol-co-terephthlate-fumarate-dodecenylsuccinate) and a poly(propoxylated-ethoxylated bisphenol-co-terephthalate-dodecenylsuccinate-trimellitic anhydride).

11. The fluorescent orange latex of claim 1, having a total amount of the red fluorescent agent, the yellow fluorescent agent, and the fluorescent brightener in a range of from 0.5 weight % to 5 weight % by weight of the fluorescent orange latex and a weight ratio of the fluorescent brightener to the red and yellow fluorescent agents in a range of from 1:10 to 1:0.5, and wherein the resin is a combination of two different types of amorphous resins present in a weight ratio of from 2:3 to 3:2.

12. The fluorescent orange latex of claim 11, wherein the fluorescent brightener is Fluorescent Brightener 184 and wherein the two different types of amorphous polyester resins are a poly(propoxylated bisphenol-co-terephthlate-fumarate-dodecenylsuccinate) and a poly(propoxylated-ethoxylated bisphenol-co-terephthalate-dodecenylsuccinate-trimellitic anhydride).

13. The fluorescent orange latex of claim 12, wherein the particles have an average size in a range of from 20 nm to 1000 nm.

14. The fluorescent orange latex of claim 13, wherein the fluorescent orange latex exhibits a peak reflectance of at least 155% under illumination with ultraviolet light.

\* \* \* \* \*